(12) United States Patent
LaMontagne

(10) Patent No.: US 11,893,093 B2
(45) Date of Patent: *Feb. 6, 2024

(54) SYSTEMS AND METHODS FOR ASSET OWNER VERIFICATION IN A DIGITAL ENVIRONMENT

(71) Applicant: Trivver, Inc., Merritt Island, FL (US)

(72) Inventor: Joel LaMontagne, Merritt Island, FL (US)

(73) Assignee: Trivver, Inc., Merritt Island, FL (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/885,392

(22) Filed: Aug. 10, 2022

(65) Prior Publication Data

US 2023/0222186 A1 Jul. 13, 2023

Related U.S. Application Data

(63) Continuation of application No. 17/574,507, filed on Jan. 12, 2022, now Pat. No. 11,461,437.

(51) Int. Cl.
*H04L 29/06* (2006.01)
*G06F 21/16* (2013.01)

(52) U.S. Cl.
CPC .................. *G06F 21/16* (2013.01)

(58) Field of Classification Search
CPC .......... G06F 21/16; G06F 21/60; G06F 21/36; H04L 63/20; H04L 63/123; H04L 63/1416

USPC .......................................................... 726/26
See application file for complete search history.

(56) References Cited

U.S. PATENT DOCUMENTS

| | | | |
|---|---|---|---|
| 11,023,879 B2* | 6/2021 | Dou | G06Q 30/0205 |
| 2007/0121997 A1* | 5/2007 | Harmanci | G06T 1/0064 |
| | | | 382/100 |
| 2016/0321654 A1* | 11/2016 | Lesavich | H04L 67/104 |

* cited by examiner

*Primary Examiner* — Longbit Chai
(74) *Attorney, Agent, or Firm* — Chhabra Law Firm, PC

(57) ABSTRACT

Using various embodiments, methods and systems for verification of a digital asset owner in a digital environment are described. In one embodiment, a system is configured to receive a non-fungible token (NFT) associated with a digital asset, the NFT providing proof of ownership of the digital asset through a cryptographic public key and retrieve the digital asset. The system then retrieves a secret pattern from the digital asset, wherein the secret pattern was previously embedded into the digital asset, the secret pattern associated with the cryptographic public key and computes a first identification hash value using a hash function, the hash function receiving a parameter value derived from the secret pattern. The system then receives a second identification hash value and compares the first identification hash value to the second identification hash value. If the first and second identification hash values are identical, then the digital asset is determined to be authentic.

20 Claims, 4 Drawing Sheets

SYSTEMS AND METHODS FOR ASSET OWNER VERIFICATION IN A DIGITAL ENVIRONMENT

CROSS REFERENCE TO RELATED APPLICATIONS

The present application is a continuation of, and claims priority from, co-pending U.S. patent application Ser. No. 17/574,507, titled "SYSTEMS AND METHODS FOR ASSET OWNER VERIFICATION IN A DIGITAL ENVIRONMENT" filed on Jan. 12, 2022. The contents of the above identified application is incorporated herein by reference for all purposes to the extent that such subject matter is not inconsistent herewith.

FIELD OF THE INVENTION

Embodiments of the present invention relates generally to assets in a digital environment. More particularly, embodiments of the invention relate to owner verification of a multi-dimensional asset in a multi-dimensional environment.

BACKGROUND OF THE INVENTION

Since the advent of the digital age, adequately managing digital assets (e.g., a two dimensional image, a three dimensional object, etc.) has been problematic. Piracy, stealing, and copying of digital assets have been on the rise and is expected to continue.

Thus, what is needed is systems, methods, and techniques that attempt to overcome the aforementioned problems.

SUMMARY OF THE DESCRIPTION

Using various embodiments, systems, methods, and techniques are described herein for verification of a digital asset owner in a digital environment. A digital asset can include, without limitation, a two dimensional image, a three dimensional object, a non-fungible token, or any object (including, multi-media audio/video assets) that can be displayed in a digital environment. In one embodiment, a system can be configured to receive a digital asset where the digital asset is configured to be displayed in a multi-dimensional environment. Thereafter, the system retrieves a secret pattern within the digital asset and computes a first identification hash value using a hash function. In one embodiment, the hash function receives a parameter value derived from the secret pattern. The system then compares the first identification hash value to a second identification hash value, where the second identification hash value is provided by the owner of the digital asset. The system then determines the digital asset as authentic when the first and second identification hash values are identical.

In one embodiment, the secret pattern is embedded into the digital asset by the system. In another embodiment, the second identification hash value can be previously generated using the secret pattern. In one embodiment, the secret pattern includes at least one geometric figure, the at least one geometric figure determined by a plurality of digital asset elements. The plurality of digital asset elements can be represented by at least one a plurality of pixels, voxels, or hypervoxels, vertices, or using a mesh representation.

In one embodiment, the parameter value is determined by a distance between the plurality of digital asset elements of the at least one geometric figure within the digital asset. In yet another embodiment, the parameter value can be determined by at least one texture value assigned to the at least one geometric figure formed by the plurality of digital asset elements. In one embodiment, the at least one geometric figure is a triangle mesh.

In yet another one embodiment, the second identifier hash value is retrieved from a blockchain stored in a decentralized and distributed digital ledger.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Techniques described herein present novel implementations to identify the owner of a digital asset to prevent piracy, stealing, hacking, illegal copying, etc. of the asset. As described herein, a 'digital asset' or 'asset' refers to an N-th dimensional digital property, where 'N' is a real number that is greater than one and signifies the number of dimensions of the digital property in a multi-dimensional environment. A digital asset, without limitation, includes a two dimensional image, a three dimensional object, a non-fungible token, or any object (including, multi-media audio/video assets) that can be displayed in a digital environment. A multi-dimensional environment signifies a digital environment having two or more dimensions. Further, while a multi-dimensional environment having three or more dimensions may be, according to one implementation, a two-dimensional digital rendition of a three (or more) dimensional digital asset to create an illusion to the viewer's eye, the invention described herein, includes, and is not limited to, such rendering/display techniques.

Figure 1:
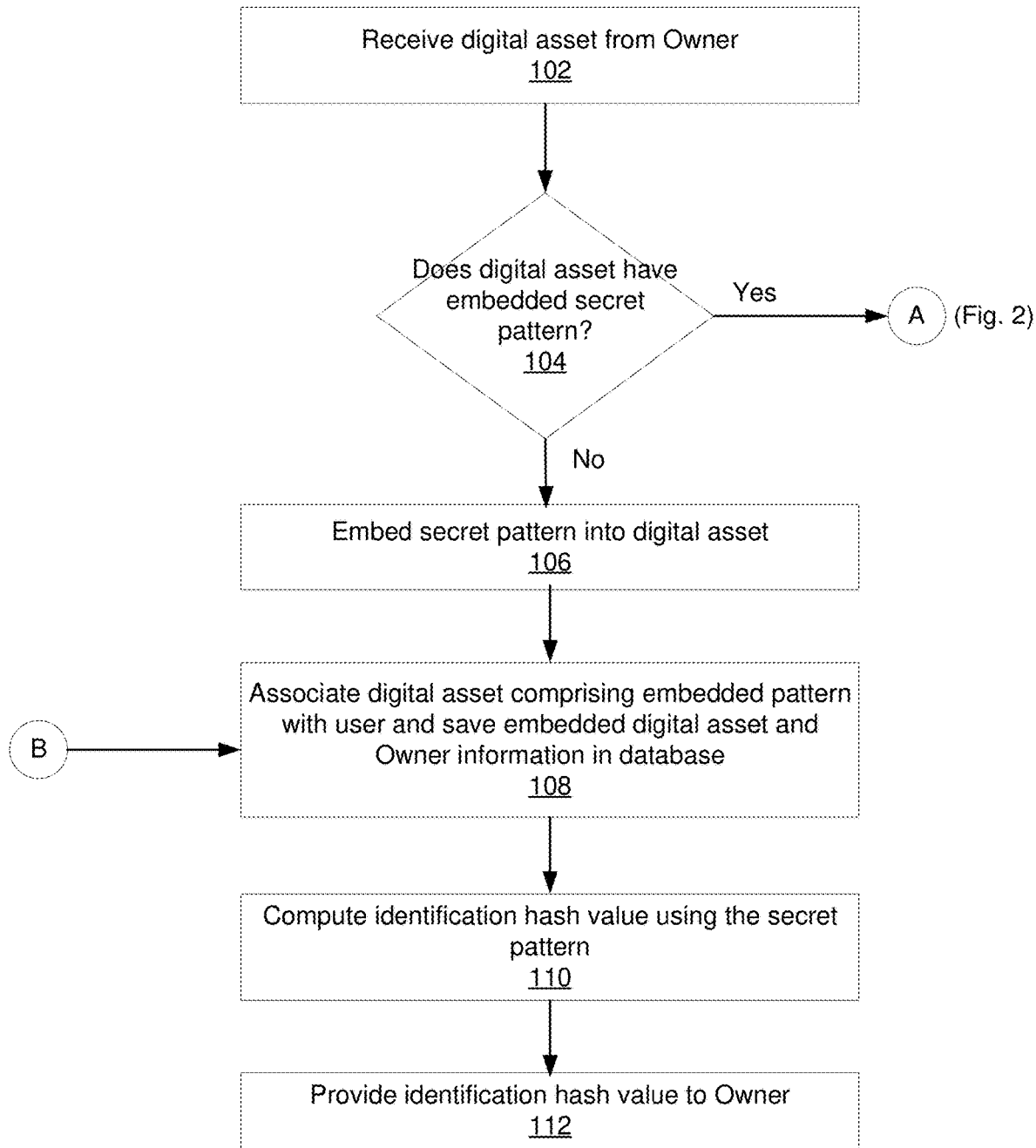
FIG. 1 illustrates a flow chart of establishing an owner of a digital asset, according to one embodiment of the present invention.
Figure 2:
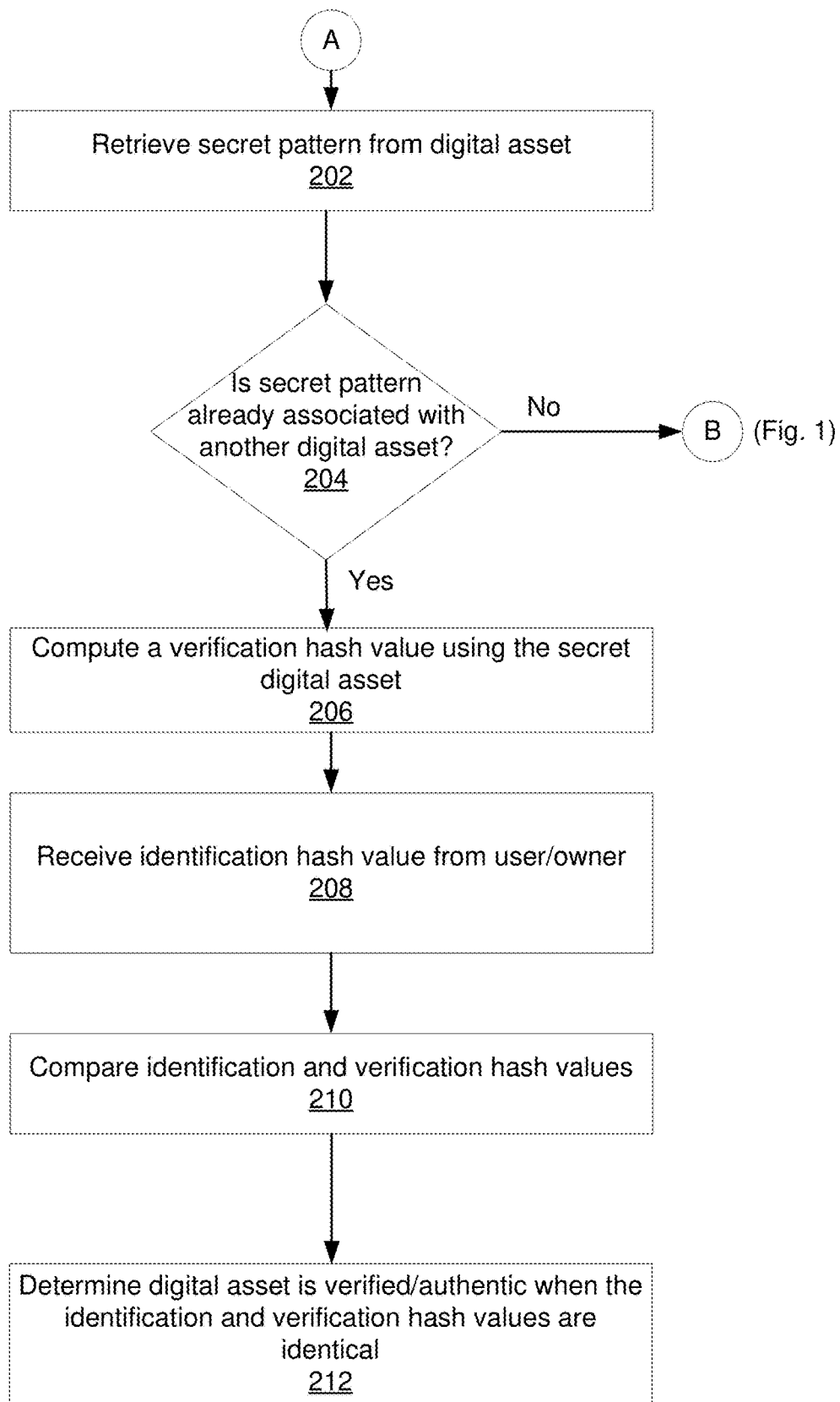
FIG. 2 illustrates a flow chart of verifying an owner of a digital asset, according to one embodiment of the present invention.

FIG. 1 illustrates a flow chart of establishing an owner of a digital asset, according to one embodiment of the present invention. As illustrated, at 102 the system receives a digital asset from a user/owner. The digital asset can be configured to be displayed in a multi-dimensional environment. At 104, the system determines whether the digital asset has an embedded secret pattern, and if so, control transfers to verifying the owner of the digital asset as illustrated in FIG. 2.

However, if no secret pattern is embedded in the digital asset, at 106, the system embeds a secret patterns into the asset. In one embodiment, secret pattern includes at least one geometric figure, the at least one geometric figure determined by a plurality of digital asset elements. The digital asset elements may include pixels, voxels, hypervoxels, a combination thereof, etc.

At 108, the digital asset comprising the embedded secret pattern is associated with the owner information. In one embodiment, the owner information can be determined from a cryptographic public key provided by the owner associated with blockchain technology. In any case, the owner information is associated with the digital asset comprising the embedded secret pattern and stored in a database. Without limitation, a database, as referenced herein can be any storage mechanism, including a conventional database, a distributed database, or a storage system developed using blockchain technology.

At 110, in one embodiment, an identification hash value is computed using a hash function. In this embodiment, the hash function can receive a parameter value derived from the secret pattern. The parameter value can be determined by a distance between the plurality of digital asset elements of the at least one geometric figure within the digital asset. In one embodiment, the parameter value includes a seed generated using a random number generator function to generate the identification hash value. This seed value can then be associated with the digital asset and stored in a database, and can be optionally also associated with the owner information. Once the identification value is generated using the hash function, at 112, the generate value is provided to the owner for safe keeping.

As a non-limiting example, in reference to a two dimensional digital asset, the secret pattern can be determined using a geometric figure (e.g., line, triangle, polygon, etc.) composed from pixels in the digital asset. In one embodiment, the parameter value passed to the hash function can be the geometric figure or a portion thereof. The hash function can then determine the distance between the pixels from a predetermined reference point to compute a corresponding hash value.

Similarly, in reference to a three dimensional digital asset, the secret pattern can be determined using a geometric figure determined by a polygon mesh composed from voxels in the digital asset. In one embodiment, a polygon mesh is a collection of vertices, edges and faces that defines the shape of a polyhedral object. The faces generally consist of triangles (triangle mesh), quadrilaterals (quads), or other simple convex polygons (n-gons).

In one embodiment, digital assets created with polygon meshes can store different types of digital asset elements. Thus, in this embodiment, the geometric figure can include vertices, edges, faces, polygons and surfaces. In one embodiment, a vertex is the point at which two or more lines of a polygon mesh connect. These are predefined points created during creation of the digital asset and can be manipulated to change the shape of the digital asset. The vertex is a position (usually in 3D space) along with other information such as color, normal vector and texture coordinates. As defined herein, an edge is a connection between two vertices and a face is a closed set of edges. Thus, a triangle face can have three edges and a quad face has four edges. A polygon is a coplanar set of faces. The normal is a directional vector associated with a vertex, intended as a replacement to the true geometric normal of the surface. In one embodiment, it is computed as the normalized average of the surface normal of the faces that contain that vertex. A UV coordinate system is a two dimensional representation of the mesh 'unfolded' to show what portion of a two-dimensional texture map is applied to different polygons of the mesh.

In one embodiment, index arrays are used to represent a mesh using two separate arrays—one array holding the vertices, and another holding sets of three indices into that array which define a triangle mesh. The graphics system processes the vertices first and renders the triangles afterwards, using the index sets working on the transformed data.

In one embodiment, any of the aforementioned information related to a mesh (e.g., vertex position, face, edge, color, normal vector, texture coordinates, UV coordinates, index arrays, or a combination thereof) can be used as a parameter value derived from the secret pattern and passed to the hash function. In another embodiment, the parameter value can be determined by at least one texture value assigned to the at least one geometric figure formed by the plurality of digital asset elements.

FIG. 2 illustrates a flow chart of verifying an owner of a digital asset, according to one embodiment of the present invention. When the digital asset is a non-fungible token (NFT), the data can be stored on a blockchain, forming a digital ledger. As known to a person having ordinary skill in the art, an NFT is a digital asset which provides proof of ownership of an associated or related digital asset. The NFT can thus be associated with one or more photographs, videos, audio, or images, which are also referred to as digital assets, as set forth above. While, generally, a blockchain can be used to provide a public certificate of authenticity or proof of ownership, it does not restrict the sharing or copying of the underlying digital files. To overcome this issue, in one embodiment, a secret pattern from a digital asset (that is previously authenticated by the owner as illustrated in FIG. 1), can be retrieved, as illustrated at 202. At 204, it is determined whether the pattern is already associated with another digital asset. If so, a verification hash value is derived using the hash function by utilizing the extracted secret pattern from the digital asset available to the system. Here, the hash function receives a parameter value derived from the extracted secret pattern. As illustrated in FIG. 1 and its corresponding disclosure, here as well, the parameter value can be determined by a distance between the plurality of digital asset elements of the at least one geometric figure within the digital asset. In any case, the same techniques employed to generate the verification hash value for the owner (in FIG. 1) are utilized here to generate the verification hash value.

In embodiments where the parameter value included the seed generated using a random number generator function, the system obtains the seed value that was associated with the digital asset. The user is then, at 208, asked to provide the identification hash value that was previously generated when the digital asset was associated with the owner. If the user fails to provide this hash value or supplies an incorrect value, it is presumed that the digital asset is stolen and authentication/verification of the asset fails.

If, however, the user provides the identification hash value, at 210, the value is compared with the verification hash value computed at 206. At 212, the digital asset is determined to be verified when the verification hash value and the user supplied identification hash value are identical.

Figure 3:
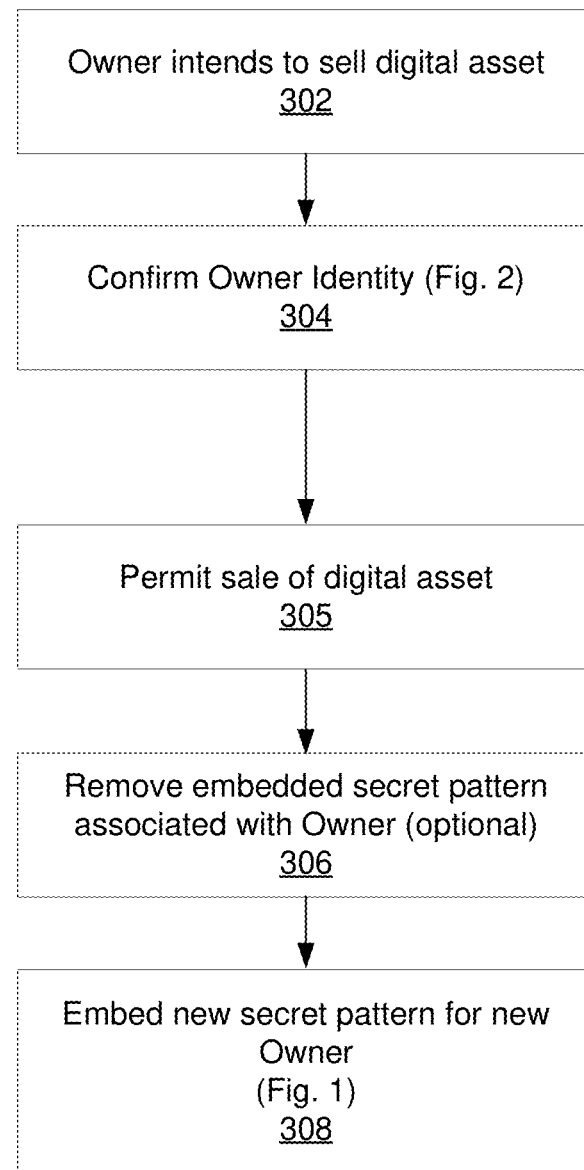
FIG. 3 illustrates a flow chart of modifying/transferring ownership of a digital asset, according to one embodiment of the present invention.

FIG. 3 illustrates a flow chart of modifying/transferring ownership of a digital asset, according to one embodiment of the present invention. As illustrated, at 302, the owner intends to sell their digital asset. As 304, the identity of the owner is confirmed as described in FIG. 2 and its corresponding disclosure herein. At 305, the system permits sale of the digital asset. In an optional embodiment, at 306, the secret pattern that was previously embedded into the asset is removed. At 308, a new secret pattern is embedded into the asset as set forth in FIG. 1 and its corresponding disclosure. In the embodiment in which the secret pattern associated with the previous owner is not removed, embedding a new pattern permits the system to identify the previous owner(s) associated with the digital asset, since the previously embedded patterns remain associated with the respective ownership information. Doing so would permit the system to validate and maintain a chain of ownership of the digital asset.

In one embodiment, the process described in FIG. 3 is performed automatically using blockchain technology (e.g., smart contracts). In this embodiment, a smart contract is created authorizing the sale of the digital asset if the system, as described herein, is able to verify and authenticate the owner of the asset. Thus, in this embodiment, the owner provides the digital asset they intend to sell, their cryptographic public key, the identification hash value known to them, and the buyer's/new owner's cryptographic public key. Once the owner verification is complete, the sale transaction is permitted to complete, as illustrated at 305. Thereafter, a new secret pattern is embedded and the digital asset is associated with the new owner's cryptographic public key, as described in FIG. 1 and its corresponding disclosure. The system then returns the digital asset and the newly generated identification hash value to the new owner.

Figure 4:
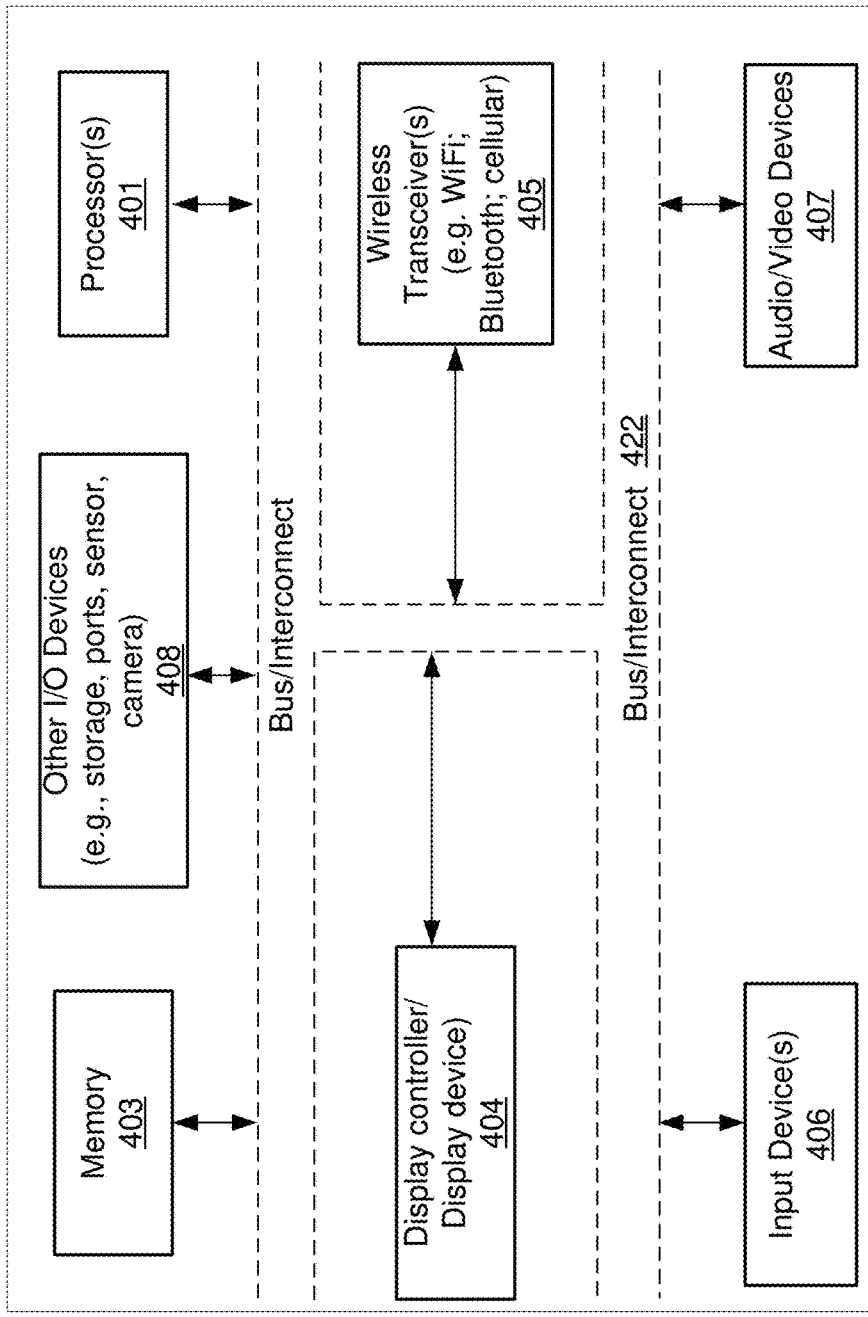
FIG. 4 is a block diagram illustrating a data processing system such as a computing system which may be used with one embodiment of the invention.

FIG. 4 is a block diagram illustrating a data processing system such as a computing system 400 which may be used with one embodiment of the invention. For example, system 400 can be implemented as part of a system for verification of a digital asset owner in a digital environment. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

System 400 can have a distributed architecture having a plurality of nodes coupled through a network, or all of its components may be integrated into a single unit. Computing system 400 can represent any of the data processing systems described above performing any of the processes or methods described above. In one embodiment, computer system 400 can be implemented as integrated circuits (ICs), discrete electronic devices, modules adapted to a circuit board such as a motherboard, an add-in card of the computer system, and/or as components that can be incorporated within a chassis/case of any computing device. System 400 is intended to show a high level view of many components of any data processing unit or computer system. However, it is to be understood that additional or fewer components may be present in certain implementations and furthermore, different arrangement of the components shown may occur in other implementations. System 400 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 400 includes processor 401, memory 403, and devices 405-408 via a bus or an interconnect 422. Processor 401 can represent a single processor or multiple processors with a single processor core or multiple processor cores included therein. Processor 401 can represent one or more general-purpose processors such as a microprocessor, a central processing unit (CPU), Micro Controller Unit (MCU), etc. Processor 401 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 401, can also be a low power multi-core processor socket such as an ultra low voltage processor, may act as a main processing unit and central hub for communication with the various components of the system. Such processor can be implemented as a system on chip (SoC).

Processor 401 is configured to execute instructions for performing the operations and methods discussed herein. System 400 further includes a graphics interface that communicates with graphics subsystem 404, which may include a display controller and/or a display device. Processor 401 can communicate with memory 403, which in an embodiment can be implemented via multiple memory devices to provide for a given amount of system memory. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 403 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 403 may store information including sequences of executable program instructions that are executed by processor 401, or any other device. System 400 can further include IO devices such as devices 405-408, including wireless transceiver(s) 405, input device(s) 406, audio IO device(s) 407, and other IO devices 408.

Wireless transceiver 405 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 406 can include a mouse, a touch pad, a touch sensitive screen (which may be integrated with display device 404), a pointer device such as a stylus, and/or a keyboard (e.g., physical keyboard or a virtual keyboard displayed as part of a touch sensitive screen). Other optional devices 408 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 408 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 422 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, in one embodiment, a mass storage (not shown) may also couple to processor 401. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Note that while system 400 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium for verification of a digital asset owner in a digital environment are described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A system to provide proof of ownership of a digital asset associated with a non-fungible token (NFT), comprising:
   a memory device;
   a processing system, comprising at least one hardware core, configured to:
   receive the NFT associated with the digital asset, the NFT providing proof of ownership of the digital asset through a cryptographic public key which is stored on a blockchain associated with the NFT;
   retrieve the digital asset associated with the received NFT, the digital asset configured to be displayed in a multi-dimensional environment;
   retrieve a secret pattern from the digital asset, wherein the retrieved secret pattern was previously embedded into the digital asset and is associated with the stored cryptographic public key on the blockchain;
   compute a first identification hash value using a hash function, wherein the hash function receives a parameter value derived from the retrieved secret pattern;
   receive a second identification hash value;
   compare the computed first identification hash value to the received second identification hash value; and
   determine the digital asset as authentic when the first and second identification hash values are identical.

2. The system of claim 1, wherein the digital asset is at least one of a photograph, video, audio, image, a two dimensional object, or a three dimensional object.

3. The system of claim 1, wherein second identification hash value was previously generated using the secret pattern.

4. The system of claim 1, wherein the second identification hash value is provided by the owner of the digital asset.

5. The system of claim 1, wherein the second identifier hash value is retrieved from a blockchain stored in a decentralized and distributed digital ledger associated with the NFT.

6. The system of claim 1, wherein the secret pattern includes at least one geometric figure, the at least one geometric figure determined by a plurality of digital asset elements.

7. The system of claim 5, wherein the parameter value is determined by a distance between the plurality of digital asset elements of the at least one geometric figure within the digital asset.

8. A method for providing proof of ownership of a digital asset associated with a non-fungible token (NFT) comprising:
   receiving, by a computer device, the NFT associated with the digital asset, the NFT providing proof of ownership of the digital asset through a cryptographic public key which is stored on a blockchain associated with the NFT;
   retrieving the digital asset associated with the received NFT, wherein the digital asset is configured to be displayed in a multi-dimensional environment;

retrieving a secret pattern from the digital asset, wherein the retrieved secret pattern was previously embedded into the digital asset digital asset and is associated with the stored cryptographic public key on the blockchain;

computing a first identification hash value using a hash function, wherein the hash function receives a parameter value derived from the retrieved secret pattern;

receiving a second identification hash value;

comparing the computed first identification hash value to the received second identification hash value; and determining the digital asset as authentic when the first and second identification hash values are identical.

9. The method of claim 8, wherein the digital asset is at least one of a photograph, video, audio, image, a two dimensional object, or a three dimensional object.

10. The method of claim 8, wherein second identification hash value was previously generated using the secret pattern.

11. The method of claim 8, wherein the second identification hash value is provided by the owner of the digital asset.

12. The method of claim 8, wherein the second identifier hash value is retrieved from a blockchain stored in a decentralized and distributed digital ledger associated with the NFT.

13. The method of claim 8, wherein the secret pattern includes at least one geometric figure, the at least one geometric figure determined by a plurality of digital asset elements.

14. The system of claim 13, wherein the parameter value is determined by a distance between the plurality of digital asset elements of the at least one geometric figure within the digital asset.

15. A non-transitory computer readable medium comprising instructions which when executed by a processing device executes a method for providing proof of ownership of a digital asset associated with a non-fungible token (NFT), comprising:

receiving the NFT associated with the digital asset, the NFT providing proof of ownership of the digital asset through a cryptographic public key which is stored on a blockchain associated with the NFT;

retrieving the digital asset associated with the received NFT, wherein the digital asset is configured to be displayed in a multi-dimensional environment;

retrieving a secret pattern from the digital asset, wherein the retrieved secret pattern was previously embedded into the digital asset and is associated with the stored cryptographic public key on the blockchain;

computing a first identification hash value using a hash function, wherein the hash function receives a parameter value derived from the retrieved secret pattern;

receiving a second identification hash value;

comparing the computed first identification hash value to the received second identification hash value; and determining the digital asset as authentic when the first and second identification hash values are identical.

16. The non-transitory computer readable medium of claim 15, wherein the digital asset is at least one of a photograph, video, audio, image, a two dimensional object, or a three dimensional object.

17. The non-transitory computer readable medium of claim 15, wherein second identification hash value was previously generated using the secret pattern.

18. The non-transitory computer readable medium of claim 15, wherein the second identification hash value is provided by the owner of the digital asset.

19. The non-transitory computer readable medium of claim 15, wherein the second identifier hash value is retrieved from a blockchain stored in a decentralized and distributed digital ledger associated with the NFT.

20. The non-transitory computer readable medium of claim 15, wherein the secret pattern includes at least one geometric figure, the at least one geometric figure determined by a plurality of digital asset elements, and wherein the parameter value is determined by a distance between the plurality of digital asset elements of the at least one geometric figure within the digital asset.

* * * * *